United States Patent Office 3,499,017
Patented Mar. 3, 1970

3,499,017
ALKALINE HYDROLYZED PHOSPHATIDES
Paul F. Davis, Addison, Ill., assignor to The Central Soya Company, Inc., Chicago, Ill., a corporation of Indiana
No Drawing. Filed June 4, 1968, Ser. No. 734,241
Int. Cl. C11c 3/00
U.S. Cl. 260—403                                    9 Claims

ABSTRACT OF THE DISCLOSURE

Soybean phosphatides in emulsion form are treated with aqueous base or basic salt and selectively hydrolyzed giving lyso phosphatides, fatty acids, and possibly amides and other modified phosphatides. The products formed have improved properties for the formation of oil-in-water emulsions in the presence of calcium and magnesium ions. Further, the alkaline hydrolysate can be treated with inorganic or organic acids to give fluid products which retain their emulsification properties. Alternatively, the alkaline hydrolysate is treated with organic acid anhydrides giving fluid, water dispersible products having good wetting and stabilizing properties for the dispersion of fat-containing powders in aqueous media, while retaining the oil-in-water emulsification activity. Acid and organic acid anhydride-treated alkaline hydrolysates are bleached using normal oxidative bleaching agents and the bleached products have dough conditioning and crub softening activity in commercial white bread formulations.

BACKGROUND AND SUMMARY OF INVENTION

The phosphatides with which this invention is concerned are available commercially from vegetable sources (i.e., the soybean) and are commonly referred to as "lecithins" or "soybean lecithins." When the terms "lecithin" and "soybean lecithin" are used hereinafter, reference is made to the article of commerce and not to phosphatidyl choline. In addition to phosphatidyl choline, soybean lecithin contains phosphatidyl ethanolamine, phosphatidyl inositol, phosphatidic acid, other phosphatides, carbohydrates, sterols, sterol glucosides, metallic ions, etc. Such products may contain 25 to 50% of soybean oil or other carriers or diluents, or may be essentially free of carriers or diluents.

The surface-active properties of soybean lecithin have been utilized for many years to provide wettable powders and for oil-in-water emulsification. Notwithstanding this long usage, there are certain powdered materials, generally containing fat, wherein the wetting properties of soybean lecithin are not satisfactory. It has been common practice to mix other surface-active agents, such as polyoxyethylene derivatives of fatty acids or of sorbitan fatty acid esters with soybean lecithin to give compositions having acceptable wetting properties when dispersed on powdered materials. When used to prepare oil-in-water emulsions in hard water, the calcium and/or magnesium ions cause the emulsion to break and give a cream layer consisting of hydrated soybean lecithin and oil or fat on the surface of an aqueous phase.

Several processes are known by which soybean lecithin can be modified in an attempt to overcome the objectionable surface-active properties listed above. Soybean lecithin can be reacted directly with acid anhydrides to improve wetting and emulsification properties, as in my earlier Patent No. 3,301,881.

In contrast to the teaching above, the first step in this invention is the controlled partial hydrolysis of soybean phosphatides with an aqueous base or basic salt (e.g., sodium hydroxide, sodium carbonate, sodium bicarbonate). The two main products of the hydrolysis are fatty acids and lysophosphatides as found by two-dimensional TLC (thin-layer chromatography) on neutral silica gel. The products of the alkaline hydrolysis (pH about 9.0) are water hydratable and dispersible and have improved properties for the formation of oil-in-water emulsions in emulsion systems containing calcium and/or magnesium ions. The best product properties are found in products which have been hydrolyzed to convert from about one-half to about two-thirds of the original phosphatides to the lyso derivatives. The hydrolysis can be done to a lesser or greater extent to prepare products with improved emulsification properties when compared to the starting lecithin base.

However, the alkaline hydrolyzed soybean lecithin products disclosed cannot readily be bleached with normal oxidative bleaching agents (i.e., hydrogen peroxide) because of peroxide decomposition, and the products become plastic in consistency when stored at 75° to 80° F. In one preferred embodiment of the invention, the partially hydrolyzed phosphatide emulsion is treated with acid to adjust the pH to less than about 8.0, following which oxidative bleaching can be accomplished by normal procedures. Hydrochloric and lactic acids are examples of inorganic and organic acids found useful for the pH adjustment. The acid-treated partially hydrolyzed products having a pH of less than about 7.8 are fluid in consistency at 75 to 80° F., but are not readily hydrated by or dispersible in water. Emulsification properties are not markedly altered by the acid treatment.

Soybean lecithin partially hydrolized with an aqueous base or basic salt does not have the wetting properties desired for the rapid dispersion and sabilization of powdered materials. Treatment with acid, as disclosed above, marginally reduces the wetting and stabilizing properties of the partially hydrolyzed products. In another preferred embodiment of the invention, the alkaline hydrolysate is reacted with acetic anhydride to form amides by reaction with primary amine in the product. This gives the following benefits: ((1) water dispersibility is retained; (2) the product can be bleached without peroxide decomposition; (3) wetting and stabilizing properties for fat-containing powders are markedly improved; (4) a fluid product is obtained; (5) emulsification properties are not affected. Reaction with dibasic organic acid anhydrides such as succinic, maleic, and phthalic in place of acetic anhydride, give similar modified products with the following differences: (1) water dispersibility is slower; (2) oil-in-water emulsification is improved; (3) wetting and stabilization of fat-containing powders is marginally inferior to products prepared using acetic anhydride.

In my earlier patent, soybean lecithin was reacted with acid anhydrides followed by addition of base, if desired. The present method of reaction is an improvement in that: (1) lesser quantities of acid anhydride are required to obtain the desired degree of reaction with primary amines; (2) fluid, water hydratable, dispersible products can be obtained.

Alkaline hydrolysis of phosphatides is not new. A summary of the older hydrolytic procedures used has been given [Wittcoff, H., The Phosphatides, Reinhold Publishing Corp., New York, N.Y., 1951, pages 15 and 16]. The hydrolyses were conducted with large excess of base to give deacylated products which were used to determine the composition of the original phosphatide. Phosphatide compositions have been prepared by admixture with acids, bases, and salts for which various claims have been made [ibid., pages 499 and 500]. Schwieger Patent 2,020,662 teaches a composition containing at least 10% solid alkali metal hydroxide which is water dispersible. Engelman Patent 1,972,764 teaches a composition consisting of 40% lecithin, 30% oil, and 30% water to which is added 0.5 to 1.5% alkali reacting substance to give stable, non-fermenting emulsions. Interest in phosphatide hydrolysis procedures has continued, and Dawson [Biochem. J. 75 45 (1960)] has published procedures for alkaline and acid hydrolysis to give deacylated products (fatty acids, fatty aldehydes, and water-soluble phospho diesters). However, no published work has been found which indicates that the authors were aware of the fact that controlled partial alkaline hydrolysis of phosphatides, as disclosed here, is suitable for the preparation of lysophosphatides and fatty acids having improved surface-active properties.

In my earlier patent concerning acid hydrolysis of phosphatides, lysophosphatides and fatty acids were formed as is the case in the present invention. However, the products of the acid and base hydrolyses are different functionally; acid hydrolysis gives products with good wetting properties; base hydrolysis does not. Further, modified, base hydrolyzed products can be bleached with hydrogen peroxide whereas the acid hydrolyzed products suffer color reversion during storage after hydrogen peroxide treatment. These factors indicate that products of acid and base hydrolysis are different although certain similarities in composition are found.

DETAILED DESCRIPTION

In the examples set down hereinafter, certain analytical techniques were employed, which are defined as follows:

ANALYTICAL METHODS

*Acetone insolubles (A. I.)*—AOCS (American Oil Chemists' Society) Method Ja 4–46 except that non-saturated acetone was used.

*Acid value.*—A modification of AOCS Method Ja 6–55 was used. The solvent was neutralized benzene/ethanol (4/1) and the titrant was ethanolic potassium hydroxide. The samples were titrated warm. This procedure gives higher values than the official procedure by about 1.5 to 5.0 mg. of potassium hydroxide per 1 gram of sample.

*pH (1%).*—A 1.0% emulsion was made in 30% aqueous ethanol by heating and agitating and was cooled to 25° C. for analysis using a Beckman Model 76 pH meter with glass indicating and calomel reference electrodes.

*Viscosity.*—Determined at 80° F ±0.5 using a Brookfield Viscometer Model LVT following the manufacturer's suggestions for spindle and speed (r.p.m.) usage.

*Formal titration.*—The sample used for pH determination above (1.00 g. phosphatide in 100 ml. solvent) was adjusted to pH=9.00 with 0.1 N aqueous potassium hydroxide and 10.0 ml. of 37% formaldehyde (adjusted to pH=9.00) was added. The emulsion was again titrated to pH=9.00 with standard base giving a measure of primary amine nitrogen.

*Emulsion test.*—1.5 grams lecithin and 13.5 g. fat (50% lard, 50% beef tallow) was warmed and mixed and poured onto the surface of 350 ml. of 100 grain hardness water (0.252% calcium chloride dihydrate) at 75° C. in a 600 ml. Pyrex beaker. The system was stirred intermittently with a thermometer until an oil-in-water emulsion formed or until a temperature of 50° C. was reached.

Preparation and testing of fat-containing dry powder

*Preparation.*—2.0 grams lecithin and 10.0 grams beef tallow were warmed to 60° C., mixed, and added to 88.0 grams N.F.D.M. (non-fat dry milk, spray dried, low heat treatment, edible grade) which had been preheated to 50° C. A spatula was used to uniformly coat the N.F.D.M. with the fat-lecithin mixture. The powder was sifted through a wire mesh and stored for several weeks before test. This formulation is relatively difficult to wet and stabilize and makes a good system to differentiate surface active properties of additives.

*Wetting test.*—10.0 grams of dry mix above was added on the surface of 92.0 ml. 25° C. tap water (7.5 grains hardness) in a 250 ml. Pyrex beaker containing a one inch Teflon-covered magnetic mixing bar 5 seconds before mixing was to start. A magnetic mixer (Magnestir, Aloe Scientific Co., Cat. No. 75652) at a setting of zero was used to mix the product for 120 seconds. Wetting time was the number of seconds required to wet the dry product.

*Stability test (mls. "cream").*—After 120 seconds mixing, the composition was poured into 100 ml. Pyrex graduates. With this formulation, the only separation found was a top layer reported as "cream" after 5, 10, and 30 minutes storage at 25° C.

EXAMPLE 1

Natural-grade plastic unbleached soybean lecithin (Table 1, No. 1) was mixed with aqueous sodium hydroxide solution to give emulsions containing 20% water and the base concentrations listed. The hydrolyses were conducted at 68° C. for 16 to 18 hours following which a portion of each emulsion was vacuum dried (Nos. 2, 4, 6, 8, 10), and a portion of each was treated with hydrochloric acid and vacuum dried (Nos. 3, 5, 7, 9, 11). The alkaline products were relatively unchanged in A.I. (acetone insolubles) and were of plastic consistency at 80° F. The last sample in the series (No. 10) began to exhibit signs of incompatibility (very cloudy) although no separation of components was found. Products treated with hydrochloric acid have lower A.I. contents, which is a function of the extent the hydrolysis has been conducted Products change from plastic to fluid at pH's of less than about 7.8 when hydrochloric acid is used for partial neutralization of the added base. The last listed hydrochloric acid-treated sample (No. 11) exhibited some separation of components when stored at 25° C.

Samples No. 1, 6 and 10 were analyzed by two-dimensional TLC on neutral silica gel. Sample No. 1 (natural-grade) gave a small fatty acid spot (chromatographic component) and very faint spots (chromatographic components) for lyso phosphatides. Sample No. 6 had a large concentration of fatty acids and large concentrations of lyso phosphatides. Sample No. 10 was similar to No. 6 with larger concentrations of hydrolyzed products. In comparison to chromatograms of selectively acid hydrolyzed lecithin, the base hydrolysis forms at least one more component which is relatively non-polar and may be an amide.

Certain surface-active properties are listed in Table 2. The products from alkaline hydrolysis have improved surface active and emulsifying properties for food and industrial uses. The products treated with hydrochloric acid after alkaline hydrolysis are marginally superior to the alkaline products for forming oil-in-water type emulsions in 100 grain hardness water.

Normal oxidative bleaching of the alkaline products (pH 9.0) was not satisfactory due to rapid decomposition of the added hydrogen peroxide. Products treated with acid (hydrochloric and lactic acids were tested) to reduce the pH to less than about 8.0, were readily bleached with hydrogen peroxide and the color did not revert on storage of the bleached products.

Sample Nos. 1 and 7 (Table 1) were double-bleached by treatment with 0.5% benzoyl peroxide and 1.5% of 35% hydrogen peroxide using conventional procedures. These products were tested in a commercial type white bread made using the sponge and dough method against two controls: (1) 2.5% lard; (2) 2.5% lard and 0.5% monoglyceride composition. The monoglyceride composition consisted of 25% distilled monoglycerides and 75% water. The double-bleached natural-grade lecithin at 0.5% (based on flour weight) with 2.5% lard gave softness results equivalent to the 2.5% lard control. The double-bleached product prepared from sample No. 7 was equivalent in softness at 0.5% concentration to the bread prepared using the commercial monoglyceride composition. These hydrolyzed products are functionally suitable as dough conditioners and crumb softeners for commercial type white bread. Natural-grade lecithin has dough conditioning activity, but is essentially devoid of bread softening activity.

fied products are suitable for wetting and stabilizing fat-containing dry powders.

Samples No. 3 and 7 (Table 3) were double-bleached. The products were bleached satisfactorily and the color did not revert on storage. The bleached products were used as surface-active agents in the preparation of commercial white bread. Sample No. 7 (Table 3, 2.16%

TABLE 1.—HYDROLYSIS OF SOYBEAN PHOSPHATIDES WITH VARIABLE SODIUM HYDROXIDE CONCENTRATION; HYDROCHLORIC ACID TREATMENT (MOISTURE CONTENT 20%; HYDROLYZED AT 63° C.)

| Sample number | Percent A.I. | Percent NaOH | Acid value from hydrolysis* | Percent HCl | pH (1%) | Final acid value | Viscosity, cps. at 80° F. | Visual clarity |
|---|---|---|---|---|---|---|---|---|
| 1 | 69.8 | 0 | | | 7.33 | 24.5 | Plastic | Clear, melted. |
| 2 | 68.0 | 1.75 | 16.2 | 0 | 9.10 | 16.2 | Plastic | Do. |
| 3 | 64.6 | 1.75 | 16.2 | 1.07 | 7.47 | 32.7 | 20,000 | Sl. hazy. |
| 4 | 68.0 | 1.97 | 19.3 | 0 | | 16.3 | Plastic | Clear, melted. |
| 5 | 62.0 | 1.97 | 19.3 | 1.21 | 7.40 | 34.8 | 15,800 | Hazy. |
| 6 | 68.0 | 2.18 | 21.8 | 0 | 9.07 | 15.8 | Plastic | Sl. haze, melted. |
| 7 | 61.3 | 2.18 | 21.8 | 1.40 | 7.30 | 37.1 | 15,400 | Hazy. |
| 8 | 68.2 | 2.39 | 25.4 | 0 | | 16.4 | Plastic | Hazy, melted. |
| 9 | 58.8 | 2.39 | 25.4 | 1.68 | 7.06 | 42.0 | 7,800 | Very cloudy. |
| 10 | 68.5 | 2.61 | 28.5 | 0 | 8.97 | 16.5 | Plastic | Cloudy, melted. |
| 11 | 56.5 | 2.61 | 28.5 | 1.88 | 6.97 | 45.0 | 6,800 | Very cloudy. |

*Calculated expected increase in Acid Value from Hydrolysis with increasing amount of NaOH.

TABLE 2.—EMULSIFYING, WETTING, AND STABILITY TESTS USING SODIUM HYDROXIDE HYDROLYZED SOYBEAN PHOSPHATIDES

| Sample Identification | Emulsion Test, ° C. | Wetting Time, Seconds | Mls. "Cream" After Time of— | | |
|---|---|---|---|---|---|
| | | | 5 Mins. | 10 Mins. | 30 Mins. |
| 1. Natural-grade | (*) | 100 | 30 | 23 | 18 |
| 2. 1.76% NaOH | 55 | 30 | 9 | 14 | 18 |
| 3. 1.75% NaOH, 1.07% HCl | 70 | 20 | 28 | 22 | 18 |
| 4. 1.97% NaOH | 60 | 50 | 12 | 22 | 18 |
| 5. 1.97% NaOH, 1.21% HCl | 71 | 35 | 28 | 23 | 19 |
| 6. 2.18% NaOH | 63 | 30 | 25 | 23 | 18 |
| 7. 2.18% NaOH, 1.40% HCl | 74 | 105 | 22 | 22 | 19 |
| 8. 2.39% NaOH | 65 | 50 | 25 | 23 | 18 |
| 9. 2.39% NaOH, 1.68% HCl | 74 | 60 | 30 | 22 | 18 |
| 10. 2.61% NaOH | 65 | 90 | 22 | 23 | 17 |
| 11. 2.61% NaOH, 1.88% HCl | 74 | 60 | 29 | 28 | 19 |

*No emulsion.

EXAMPLE 2

This example illustrates that the alkaline hydrolyzed lecithin can be modified to improve wetting and stabilizing properties by treatment with organic acid anhydride. Natural-grade plastic unbleached soybean lecithin (Table 3, No. 1) was treated with aqueous sodium hydroxide solution and hydrolyzed as given in Example 1. After the partial hydrolysis, acetic anhydride was added, mixed, and the resulting acetic acid removed by a combination of vacuum drying and deodorization using steam. Acetic anhydride addition and reaction with primary amine groups reduced the pH of the products and gave fluid products which were hydratable by and dispersible in water. Treatment with hydrochloric acid, as reported in Example 1, to obtain fluid products, gave products which could be readily dispersed in water. Samples No. 3 and 7 (Table 3) appeared to be about optimally treated for rapid hydration by and dispersion in water.

This sample series was tested for surface-active properties as listed in Table 4. Emulsion forming properties are developed between samples 3 and 4; all of the modified products were equivalent in softening activity to the hydrolyzed, hydrochloric acid-treated product in Example 1 (Table 1, No. 7). Sample No. 3 (Table 3, 3.24% acetic anhydride) gave no softening action and was equivalent to the control (2.5% lard) and to the natural-grade lecithin. Reaction with acetic anhydride is optimally carried out using the stoichiometric concentration necessary to react with available primary amine groups. Excess acetic anhydride tends to acetylate hydroxyl groups and reduce the functionality of the products for certain applications.

Two dimensional TLC of samples No. 3 and 7 (Table 3) indicated that the phosphatidyl ethanolamine and lyso phosphatidyl ethanolamine were essentially completely acetylated by the acetic anhydride treatments. The acetylated phosphatidyl ethanolamine moved with a component formed during the alkaline hydrolysis, indicating the possibility that some amides are formed during the hydrolysis. Further analyses of acylated products are given in Example 3.

TABLE 3.—EFFECT OF ACETYLATION ON ANALYSES OF SODIUM HYDROXIDE HYDROLYZED * SOYBEAN PHOSPHATIDES

| Same Identification | Percent A.I. | pH (1%) | Acid Value From Hydrolysis | Final Acid Value | Viscosity, cps. at 80° F. | Visual Clarity |
|---|---|---|---|---|---|---|
| 1. Natural-grade | 65.6 | 7.50 | 0 | 21.4 | Plastic | Sl. hazy, melted. |
| 2. 1.29% NaOH, 3.24% Acetic Anhydride | 60.3 | 7.76 | 12.0 | 16.7 | 8,300 | Sl. hazy. |
| 3. 1.57% NaOH, 3.24% Acetic Anhydride | 60.3 | 7.87 | 17.3 | 16.7 | 7,200 | Do. |
| 4. 1.86% NaOH, 3.24% Acetic Anhydride | 60.6 | 7.94 | 21.3 | 16.7 | 8,100 | Do. |
| 5. 2.14% NaOH, 3.24% Acetic Anhydride | 61.4 | 7.99 | 24.8 | 17.1 | 11,400 | Cloudy. |
| 6. 2.43% NaOH, 3.24% Acetic Anhydride | 61.0 | 7.94 | 28.3 | 17.1 | 13,400 | Do. |
| 7. 1.57% NaOH, 2.16% Acetic Anhydride | 60.5 | 7.76 | 17.0 | 17.9 | 6,900 | Sl. hazy. |

*At 63° C. for 17 hours.

TABLE 4.—EMULSIFYING, WETTING, AND STABILITY TESTS USING SODIUM HYDROXIDE HYDROLYZED, ACETYLATED SOYBEAN PHOSPHATIDES

| Sample Identification | Emulsion Test, °C. | Wetting Time, Seconds | Mls. "Cream" After Time of— | | |
|---|---|---|---|---|---|
| | | | 5 Mins. | 10 Mins. | 30 Mins. |
| 1. Natural-grade | (*) | 90 | 15 | 17 | 16 |
| 2. 1.29% NaOH, 3.24% Acetic Anhydride | (*) | 15 | 5 | 6 | 8 |
| 3. 1.57% NaOH, 3.24% Acetic Anhydride | (*) | 25 | 4 | 6 | 6 |
| 4. 1.86% NaOH, 3.24% Acetic Anhydride | 65 | 25 | 4 | 5 | 6 |
| 5. 2.14% NaOH, 3.24% Acetic Anhydride | 67 | 20 | 4 | 5 | 6 |
| 6. 2.43% NaOH, 3.24% Acetic Anhydride | 67 | 25 | 4 | 5 | 6 |
| 7. 1.57% NaOH, 2.16% Acetic Anhydride | (*) | 25 | 4 | 6 | 7 |

*No emulsion.

EXAMPLE 3

This example illustrates that a variety of organic acid anhydrides can be reacted with alkaline hydrolyzed lecithin to modify the surface-active properties of the products. A partially hydrolyzed phosphatide emulsion was prepared by the procedures given in Examples 1 and 2. During the hydrolysis, the emulsion changed from a viscous, non-pourable mass to a fluid which could be readily mixed and poured. The anhydrides listed in Table 5 were added to the partially hydrolyzed emulsion at 60 to 65° C. and mixed. In the case of acetic anhydride, the reaction proceeded rapidly and vacuum drying was started on completion of mixing (5 minutes). When bleached products are desired, hydrogen and benzoyl peroxides are added shortly after the acetic anhydride addition and before drying, and the water and acetic acid removed under reduced pressure after the desired color has been reached.

Solid anhydrides required a longer reaction time with partially hydrolyzed phosphatides than was the case with acetic anhydride. At 60 to 65° C., approximately 30 minutes is required to mix and react these anhydrides. Samples 4, 6, 7 and 8 (Table 5) were reacted with approximately the same molar quantity of anhydrides as sample No. 2 wherein acetic anhydride was used. The formol titration indicated that the reaction with acetic anhydride was more complete than with the other anhydrides tested under these preparative conditions. In all cases, reaction with the organic acid anhydrides converted the fluid emulsion to a very stiff consistency. Oxidative bleaching is preferably done following about a 30 minute reaction with the solid anhydrides, following which, the products are dried under reduced pressure to lower the moisture content to less than about 1.0%. The pH's of samples No. 4, 6, 7, and 8, are relatively low. The pH can be adjusted to at least as high as about 7.8 and retain fluidity, by treatment with aqueous base before vacuum drying. When bases such as sodium hydroxide, or basic salts such as sodium carbonate or bicarbonate are used for the pH adjustment, the products hydrate and disperse more readily in water than the products at pH's of about 7.0.

Partially hydrolyzed phosphatides reacted with dibasic acid anhydrides emulsify fat into 100 grain hardness water more readily than products prepared using acetic anhydrides as reported in Table 5. In Table 6, the wetting properties of the treated products were good, and the stabilization of the dispersed fat-containing powder was generally acceptable, except for sample No. 5 which had a low addition of succinic anhydride. For optimum surface-activity in the treated products, it is preferred that the stoichiometric quantity of organic acid anhydride necessary to acylate the primary amine groups be added and reacted.

In my earlier patent, products having improved surface-active properties were prepared by reaction of organic acid anhydrides with soybean lecithin which then could be treated with base if desired. Acylated products prepared by the disclosed processes are differentiated from the prior art by the following: (1) reaction with organic acid anhydrides as determined by formol titration and two-dimensional TLC is more complete with lower concentrations of organic acid anhydrides; (2) fluid, water dispersible products can be prepared using monobasic cations which was not possible with the prior art; (3) products prepared by the prior art would not emulsify fat into 100 grain hardness water; (4) prior art products did not have bread softening activity.

The difference in reaction accomplished in the emulsion state between my earlier patent and the present invention is clearly illustrated by comparison between Example 4, Table 3 in the patent and Table 5 in this example. The patent shows a formol titration of 1.61 mg. amino-nitrogen/g. after reaction with 2.9% of acetic anhydride in the emulsion state, and Example 4 points out that approximately 4% of acetic anhydride is necessary to almost completely react the amino-nitrogen in dry lecithin. In contrast, Table 5 using the present process shows that 3.24% acetic anhydride completely acylates the primary amine groups, and 2.16% gives almost complete reaction. In fact, it is preferred that lower concentrations of organic acid anhydride be used so other desirable properties of the phosphatides are not destroyed. In my earlier patent, organic acid anhydrides other than acetic were only reacted with dry lecithin (less than 1% moisture). This was due to unsatisfactory amino-nitrogen reduction when lecithin emulsion was treated with the anhydrides. Using the present processes, amino-nitrogen is reacted more completely in the emulsion state using lower concentrations of organic acid anhydrides than was possible in the prior art using essentially moisture-free reactants.

TABLE 5.—COMPARISON OF ACETIC, SUCCINIC, MALEIC, AND PHTHALIC ANHYDRIDES FOR ACYLATING SODIUM HYDROXIDE HYDROLYZED SOYBEAN PHOSPHATIDES

| Sample Identification | Percent A.I. | pH (1%) | Acid Value | Formol Titration | Viscosity, cps. at 80° F. | Emulsion Test, °C. |
|---|---|---|---|---|---|---|
| 1. Natural-grade | 65.6 | 7.50 | 21.4 | 2.40 | Plastic | (*) |
| 2. 1.57% NaOH, 2.16% Acetic Anhydride | 60.5 | 7.76 | 17.1 | 0.15 | 6,900 | (*) |
| 3. 1.57% NaOH, 3.24% Acetic Anhydride | 60.3 | 7.76 | 16.7 | 0.00 | 7,200 | (*) |
| 4. 1.53% NaOH, 2.00% Succinic Anhydride | 59.6 | 6.97 | 27.8 | 0.56 | 7,000 | 72 |
| 5. 1.53% NaOH, 1.00% Succinic Anhydride | 61.8 | 7.98 | 22.0 | 1.45 | 9,100 | 66 |
| 6. 1.82% NaOH, 2.00% Succinic Anhydride | 57.6 | 7.22 | 28.6 | 0.56 | 7,500 | 73 |
| 7. 1.53% NaOH, 2.00% Maleic Anhydride | 58.6 | 6.88 | 28.4 | 0.63 | 6,800 | 70 |
| 8. 1.53% NaOH, 3.00% Phthalic Anhydride | 58.5 | 6.93 | 27.4 | 0.77 | 5,300 | 65 |

*No emulsion.

TABLE 6.—SURFACE-ACTIVE PROPERTIES OF SODIUM HYDROXIDE HYDROLYZED, ACYLATED SOYBEAN PHOSPHATIDES

| Sample Identification | Wetting Time, Seconds | Mls. "Cream" After Time of— | | |
|---|---|---|---|---|
| | | 5 Mins. | 10 Mins. | 30 Mins. |
| 1. Natural-grade | 90 | 15 | 17 | 16 |
| 2. 1.57% NaOH, 2.16% Acetic Anhydride | 25 | 4 | 6 | 7 |
| 3. 1.57% NaOH, 3.24% Acetic Anhydride | 25 | 4 | 6 | 6 |
| 4. 1.53% NaOH, 2.00% Succinic Anhydride | 10 | 7 | 9 | 10 |
| 5. 1.53% NaOH, 1.00% Succinic Anhydride | 10 | 24 | 19 | 16 |
| 6. 1.82% NaOH, 2.00% Succinic Anhydride | 20 | 9 | 11 | 12 |
| 7. 1.53% NaOH, 2.00% Maleic Anhydride | 15 | 6 | 8 | 10 |
| 8. 1.53% NaOH, 3.00% Phthalic Anhydride | 10 | 3 | 5 | 7 |

EXAMPLE 4

This example illustrates the use of bases other than sodium hydroxide for the partial hydrolysis of soybean phosphatides. The analyses of treated products are reported in Table 7 and certain surface-active properties are listed in Table 8. Sodium carbonate and bicarbonate give slower hydrolyses than sodium hydroxide and acetylated products are plastic in consistency (Table 7, Nos. 2 and 3). Treatment with succinic anhydride gives a fluid product (Table 7, No. 5) with improved emulsifying activity (Table 8, No. 5). In general, hydrolysis with sodium carbonate or bicarbonate gave products with excellent wetting properties, perhaps because calcium and magnesium ions in the phosphatides are exchanged by sodium ions.

Calcium hydroxide hydrolyzes phosphatides satisfactorily as shown in No. 5 (Table 7); however, the acetylated derivative is not satisfactory for the stabilization of fat-containing dry powders (Table 8, No. 5).

Treatment with ammonia is shown in Table 7 (Nos. 6, 7, and 8). Ammonia is removed during vacuum drying and the pH is about 6.5 (No. 6). Treatment with acetic anhydrides was done at this point (No. 7) and was not as efficient as treatment in the presence of alkali. The last product (No. 8) is hydratable by and dispersible in water. In Table 8, it is reported that the ammonia-hydrolyzed product is not suitable for wetting and stabilizing of fat-containing dry powders (No. 6); the acetylated and neutralized derivatives are excellent for this purpose (Nos. 7 and 8).

Certain further treatments can be given to the products of this invention. Samples No. 2 and 3 (Table 7) were treated with hydrochloric acid to reduce the pH to 7.5. These products became fluid and retained their water dispersible properties. An increase in acid value and a lower A.I. was found in the acid-treated products.

TABLE 7.—HYDROLYSIS OF SOYBEAN PHOSPHATIDES WITH BASES AND BASIC SALTS; ACYLATION EFFECT ON ANALYSES

| Hydrolysis conditions | Acid value from hydrolysis | Percent and type anhydride | Percent A.I. | pH (1%) | Acid value | Formol titration | Viscosity, cps. at 80° C. |
|---|---|---|---|---|---|---|---|
| 1. Natural-grade | | | 65.6 | 7.50 | 21.4 | 2.40 | Plastic |
| 2. 2.02% Na₂CO₃, 48 hrs. at 63° C | 12.0 | 2.16% acetic | 64.0 | 8.10 | 11.6 | 0.14 | Plastic |
| 3. 3.20% NaHCO₃, 72 hrs. at 63° C | 12.6 | do | 64.6 | 7.96 | 12.1 | 0.17 | Plastic |
| 4. 1.68% Ca(OH)₂, 17 hrs. at 63° C | 14.0 | do | 64.0 | 7.68 | 15.8 | 0.30 | 15,000 |
| 5. 2.02% Na₂CO₃, 20 hrs. at 85° C | 12.1 | 2.20% succinic | | 7.23 | 27.4 | 0.56 | 9,100 |
| 6. 1.27% NH₃, 17 hrs. at 63° C | 16.0 | None | 57.0 | 6.51 | 37.4 | | 8,100 |
| 7. 1.27% NH₃, 17 hrs. at 63° C | 16.0 | 3.0% acetic | 54.5 | 4.89 | 37.6 | 0.70 | 7,000 |
| 8. 1.27% NH₃, 17 hrs. at 63° C | 16.0 | do | 57.5 | 7.50 | 24.2 | 0.30 | 10,200 |

TABLE 8.—SURFACE-ACTIVE PROPERTIES OF ALKALINE HYDROLYZED, ACYLATED SOYBEAN PHOSPHATIDES

| Sample identification | Emulsion test, °C. | Wetting time, seconds | Mls. "Cream" after time of— | | |
|---|---|---|---|---|---|
| | | | 5 mins. | 10 mins. | 30 mins. |
| 1. Natural-grade | (*) | 100 | 30 | 23 | 18 |
| 2. 2.02% Na₂CO₃, Acetylated | (*) | 15 | 4 | 6 | 7 |
| 3. 3.20% NaHCO₃, Acetylated | (*) | 15 | 5 | 6 | 7 |
| 4. 1.68% Ca(OH)₂, Acetylated | (*) | 20 | 7 | 9 | 20 |
| 5. 2.02% Na₂CO₃, Succinylated | 55 | 15 | 6 | 7 | 9 |
| 6. 1.27% NH₃ | 71 | 85 | 15 | 21 | 21 |
| 7. 1.27% NH₃, Acetylated | 72 | 35 | 3 | 4 | 5 |
| 8. 1.27% NH₃, Acetylated, 2.0% NaHCO₃ | 74 | 35 | 3 | 4 | 5 |

*No emulsion.

EXAMPLE 5

It has been shown that hydrolyses of from about 12.0 to about 26.0 mg. of potassium hydroxide/gram gave products with improved surface-active properties having acceptable stability characteristics (no separation of components). This example illustrates the effect of hydrolysis variables on the rate of hydrolysis. In Table 9, it is shown that the moisture content can be varied from 15 to 50% during the hydrolysis (Nos. 1, 2 and 3), the temperature can be varied from 50 to 80° C. (Nos. 5 and 8), and that the time of hydrolysis is primarily a function of the temperature. Hydrolysis at 80° C. for 6 hours did not darken the product and single and double bleached products were readily prepared. For commercial production, moisture contents of from about 18 to about 50%, and hydrolysis temperatures of 60 to 70° C. are desirable to accomplish the hydrolysis by reaction overnight (16 to 18 hours).

Calculations for base addition for the hydrolysis are readily made. Hydrolyses of from about 16 to 21 mg. of potassium hydroxide/g. are accomplished by addition of the stoichiometric amount of base (e.g. sodium hydroxide) to lower the acid value to zero (Example 1, Table 1, Nos. 2 and 3), and hydrolyzing for a time and at a temperature to raise the acid value to the desired level. Further additions of base serve to increase the extent of hydrolysis.

Base addition has been done in several ways: (1) addition of aqueous base to dry lecithin to give the base and moisture content desired for the hydrolysis; (2) addition of aqueous base solution to lecithin emulsion. The second procedure is preferred for commercial production, and it has been found that 50% commercial sodium hydroxide solution can be added to lecithin emulsion containing as little as 18% moisture, mixed, and the emulsion hydrolyzed satisfactorily. Base should be well mixed or local excess hydrolysis occurs leading to cloudy reacted products.

TABLE 9.—EFFECT OF TIME, TEMPERATURE, AND MOISTURE CONTENT ON RATE OF ALKALINE HYDROLYSIS OF SOYBEAN PHOSPHATIDES

| Base added | Moisture content | Hydrolysis temperature, °C. | Time, hours | Acid value increase |
|---|---|---|---|---|
| 1. 1.53% NaOH | 15 | 63 | 17 | 13.5 |
| 2. 1.53% NaOH | 35 | 63 | 17 | 16.6 |
| 3. 1.53% NaOH | 50 | 63 | 17 | 16.2 |
| 4. 1.81% NaOH | 19 | 75 | 17 | 20.2 |
| 5. 1.93% NaOH | 20 | 80 | 6 | 15.7 |
| 6. 1.93% NaOH | 20 | 63 | 13 | 15.1 |
| 7. 1.93% NaOH | 20 | 55 | 40 | 16.1 |
| 8. 1.93% NaOH | 20 | 50 | 48 | 15.7 |
| 9. 1.27% NH₃ | 20 | 63 | 16 | 20.5 |
| 10. 1.27% NH₃ | 20 | 55 | 22 | 16.6 |

To benefit the natural, unbleached soybean phosphatide, it is reacted with aqueous basic material. Representative of these materials is sodium hydroxide (Example 1) and sodium carbonate, sodium bicarbonate, calcium hydroxide and ammonia (Example 4).

The benefit occurs in the improved emulsifying properties—due to controlled, partial hydrolysis of the phosphatide. For controlling the hydrolysis, limited quantities of the basic material must be employed. Preferably this is done by adding the stoichiometric amount needed to reduce the acid value to about zero. Using this quantity from about one-half to about two-thirds of the original phosphatides are converted to the lyso derivations. Also present as a result of the reaction are fatty acids—the pH being about 9.

The water present for the hydrolysis may be associated with the original phosphatide, the basic material, or both. In any event, the moisture content of the emulsion during hydrolysis should be in the range of about 15% to about 50%.

Such a product may be used as such, it may be vacuum dried, or processed further. The dried products are water hydratable and dispersible and are particularly effective for the formation of oil-in-water emulsions, particularly where those systems contain calcium and magnesium ions.

The further processing can proceed in one of two ways. One route employs an acid (either organic or inorganic), the other an organic acid anhydride. The acid treatment (following alkaline hydrolysis) permits bleaching which is not possible with the alkaline hydrolysate. For this the pH is adjusted downwardly to less than about 8. When the pH of the acid-treated, partially hydrolyzed products is less than about 7.8, the product is fluid at temperatures in the range 75°–80° F.

The anhydride treatment yields a further advantage—beyond bleachability and retention of fluidity—in that the product has wetting properties for rapid dispersion and stabilization of powdered materials. The anhydride treatment forms amides by reaction with the primary amines of the alkaline hydrolysate.

The alkaline hydrolysate, modified or unmodified, makes possible the improvement of a wide variety of food and industrial products and in cheaper, more expeditious ways than were previously available. Although particularly effective usage is in the food area: bakery goods, desserts, salad dressings, intermediates, etc., a wide variety of industrial products are benefited by use of the products resulting from the invention.

While in the foregoing specification, a detailed description of the invention has been put down for the purpose of explanation, many variations of the details herein given may be made by those skilled in the art without departing from the spirit and scope of the invention.

I claim:
1. A process to benefit the emulsifying properties of natural, unbleached soybean phosphatide comprising mixing said phosphatide and a basic material to form an emulsion having from about 15% to about 50% moisture, the amount of said basic material mixed being about the stoichiometric amount required to reduce the acid value of the phosphatide to about zero whereby only from about one-half to about two-thirds of said phosphatide is converted to the lyso derivative.

2. The process of claim 1 in which said basic material is a member selected from the class consisting of sodium hydroxide, sodium carbonate, sodium bicarbonate, ammonia and calcium hydroxide.

3. The process of claim 1 in which the alkaline hydrolysate resulting from the mixing step is reacted with an acidic material to lower the pH to at least about 8.

4. The process of claim 3 in which the acidic material is a member selected from the class of inorganic acids and organic acid anhydrides.

5. A process comprising the treatment of natural grade unbleached phosphatide emulsion containing 15% to 50% moisture with a basic material in the stoichiometric concentration to at least reduce the acid value to zero, and reacting the emulsion at 50° to 80° C. until an acid value due to hydrolysis of 12 to 26 miligrams of potassium hydroxide/gram is obtained, and removing the moisture under reduced pressure.

6. The process of claim 5 in which an aqueous acid is added after hydrolysis and before drying to adjust the pH to less than about 7.8, the said drying being such to reduce the moisture content to less than about 1.0%.

7. The process of claim 5 in which an organic acid anhydride is added in about the stoichiometric concentration to react with primary amino-nitrogen after the hydrolysis and before drying, the reaction with said anhydride being for at least five minutes at a temperature of at least 50° C.

8. The process of claim 7 in which the anhydride is a member selected from the class consisting of succinic, maleic and phthalic anhydrides, the acylation being conducted for at least thirty minutes.

9. The process of claim 6 whereby bleached products are prepared by the addition and reaction with hydrogen peroxide, benzoyl peroxide and mixtures thereof after acid treatment.

References Cited
UNITED STATES PATENTS 3,031,478    4/1962    Klenk et al.    260—403
3,301,881    1/1967    Davis    260—403

ELBERT L. ROBERTS, Primary Examiner